US011097625B2

(12) United States Patent
Moriya et al.

(10) Patent No.: US 11,097,625 B2
(45) Date of Patent: Aug. 24, 2021

(54) VEHICLE

(71) Applicant: SUBARU CORPORATION, Tokyo (JP)

(72) Inventors: Fumiyuki Moriya, Tokyo (JP); Yuta Totsuka, Tokyo (JP); Hidehiro Takagi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 16/689,961

(22) Filed: Nov. 20, 2019

(65) Prior Publication Data
US 2020/0247249 A1 Aug. 6, 2020

(30) Foreign Application Priority Data
Feb. 5, 2019 (JP) .............................. JP2019-018854

(51) Int. Cl.
*B60R 16/033* (2006.01)
*H02J 7/02* (2016.01)
(Continued)

(52) U.S. Cl.
CPC ............ *B60L 53/122* (2019.02); *B60L 50/66* (2019.02); *B60R 16/033* (2013.01); *H02J 7/00712* (2020.01); *H02J 7/025* (2013.01); *H02J 50/10* (2016.02); *H02J 50/90* (2016.02); *B60L 53/66* (2019.02); *H02J 50/80* (2016.02)

(58) Field of Classification Search
CPC .. B60L 1/003; B60L 1/006; B60L 3/04; B60L 50/51; B60L 50/60; B60L 50/66; B60L 53/12; B60L 53/122; B60L 53/62; B60L 53/66; B60L 2270/20; B60R 16/033; H02J 7/007; H02J 7/00712; H02J 7/025; H02J 50/10; H02J 50/12; H02J 50/80; H02J 50/90; H02J 2310/48
See application file for complete search history.

(56) References Cited

U.S. PATENT DOCUMENTS

2010/0078993 A1\* 4/2010 Ichikawa .............. H02J 7/1423
307/10.1
2012/0123625 A1 5/2012 Ueo et al.
(Continued)

FOREIGN PATENT DOCUMENTS

WO WO 2011/016134 A1 2/2011

*Primary Examiner* — Levi Gannon
(74) *Attorney, Agent, or Firm* — McGinn I.P. Law Group, PLLC.

(57) ABSTRACT

A vehicle includes a battery, an electric power acquirer, a power supply unit, first and second relays, and a controller. The first relay connects and disconnects the battery to and from a power supply line. The second relay connects and disconnects the electric power acquirer to and from the power supply line. The controller executes a first switching control including switching the second relay to a connected state with the first relay kept in a connected state. In the switching of the second relay to the connected state in the first switching control, the controller reduces a difference between a potential of the second relay on the side on which the electric power acquirer is disposed and a potential of the second relay on the side on which the battery is disposed, using electric power inputted from the electric power acquirer.

8 Claims, 3 Drawing Sheets

(51) Int. Cl.
    *H02J 50/10*         (2016.01)
    *H02J 50/80*         (2016.01)
    *H02J 50/90*         (2016.01)
    *B60L 53/122*       (2019.01)
    *B60L 50/60*         (2019.01)
    *H02J 7/00*          (2006.01)
    *B60L 53/66*         (2019.01)

(56) References Cited

U.S. PATENT DOCUMENTS

| | | | |
|---|---|---|---|
| 2012/0319648 A1* | 12/2012 | Ohtomo | B60L 3/0023 320/109 |
| 2013/0249282 A1* | 9/2013 | Ishii | B60L 50/61 307/10.1 |
| 2013/0293192 A1* | 11/2013 | Abe | H02M 7/217 320/108 |
| 2014/0159478 A1* | 6/2014 | Ang | B60L 1/00 307/9.1 |
| 2015/0183325 A1* | 7/2015 | Mitsutani | B60L 50/16 307/10.1 |
| 2015/0298568 A1* | 10/2015 | Mitsutani | B60L 58/14 307/9.1 |
| 2016/0243954 A1* | 8/2016 | Moro | B60L 58/22 |
| 2017/0092023 A1* | 3/2017 | Ishii | B60L 1/006 |
| 2018/0236888 A1* | 8/2018 | Yabuuchi | H02J 7/0027 |
| 2019/0225088 A1* | 7/2019 | Masuda | G01R 31/006 |
| 2019/0237979 A1* | 8/2019 | Yamada | H02J 7/0029 |

* cited by examiner

VEHICLE

CROSS-REFERENCE TO RELATED APPLICATIONS

This application claims priority from Japanese Patent Application No. 2019-018854 filed on Feb. 5, 2019, the entire contents of which are hereby incorporated by reference.

BACKGROUND

The technology relates to a vehicle including a battery and an electric power acquirer that acquires electric power for battery charging from outside.

Vehicles such as electric vehicles (EV) and plug-in hybrid electric vehicles (PHEV) are equipped with a high-voltage battery. The high-voltage battery has large capacity and accumulates electric power for travel of a vehicle. Sometimes the high-voltage battery is used as a power supply of on-vehicle devices such as an air conditioner and a navigation system. Further, in recent years, utilities have been put into practical use. The utilities are provided for AC power supply from a power receptacle attached inside or outside a vehicle body. The high-voltage battery has also been used as a power supply of the utilities.

Such vehicles are able to acquire electric power from an external power supply and to charge the high-voltage battery. Methods of the charging may include non-contact charging and wired charging. The non-contact charging includes acquiring electric power non-contact from a power transmitting coil of ground facilities. The wired charging includes acquiring electric power by wire through a charging connector.

Generally, in vehicles equipped with a high-voltage battery, the high-voltage battery and a power supply line of a system are disconnectable through a system main relay, in order to hinder a voltage of the high-voltage battery from being unduly outputted to the power supply line. Moreover, in vehicles that are able to charge a high-voltage battery from an external power supply, an electric power acquirer and a power supply line are disconnectable through a charging relay, in order to hinder a voltage of the high-voltage battery from being unnecessarily outputted to the electric power acquirer.

International Publication No. 2011/016134 discloses an electric vehicle including a high-voltage battery, a system main relay, a charger, and an external charging relay. The system main relay connects and disconnects the high-voltage battery and a power supply line. The charger is coupled to an external power supply and charges the high-voltage battery. The external charging relay connects and disconnects the charger and the high-voltage battery.

SUMMARY

An aspect of the technology provides a vehicle including a battery, an electric power acquirer, a power supply unit, a first relay, a second relay, and a controller. The battery is configured to accumulate electric power for travel of a vehicle. The electric power acquirer is configured to acquire charging electric power from outside. The power supply unit is able to provide a power supply from the battery to a device other than a traveling motor. The first relay is configured to connect the battery to a power supply line or to disconnect the battery from the power supply line. The second relay is configured to connect the electric power acquirer to the power supply line or to disconnect the electric power acquirer from the power supply line. The controller is able to execute a first switching control. The first switching control includes switching the second relay to a connected state with the first relay kept in a connected state. In the switching of the second relay to the connected state in the first switching control, the controller is configured to reduce a difference between a potential of the second relay on the side on which the electric power acquirer is disposed and a potential of the second relay on the side on which the battery is disposed, using electric power inputted from the electric power acquirer.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
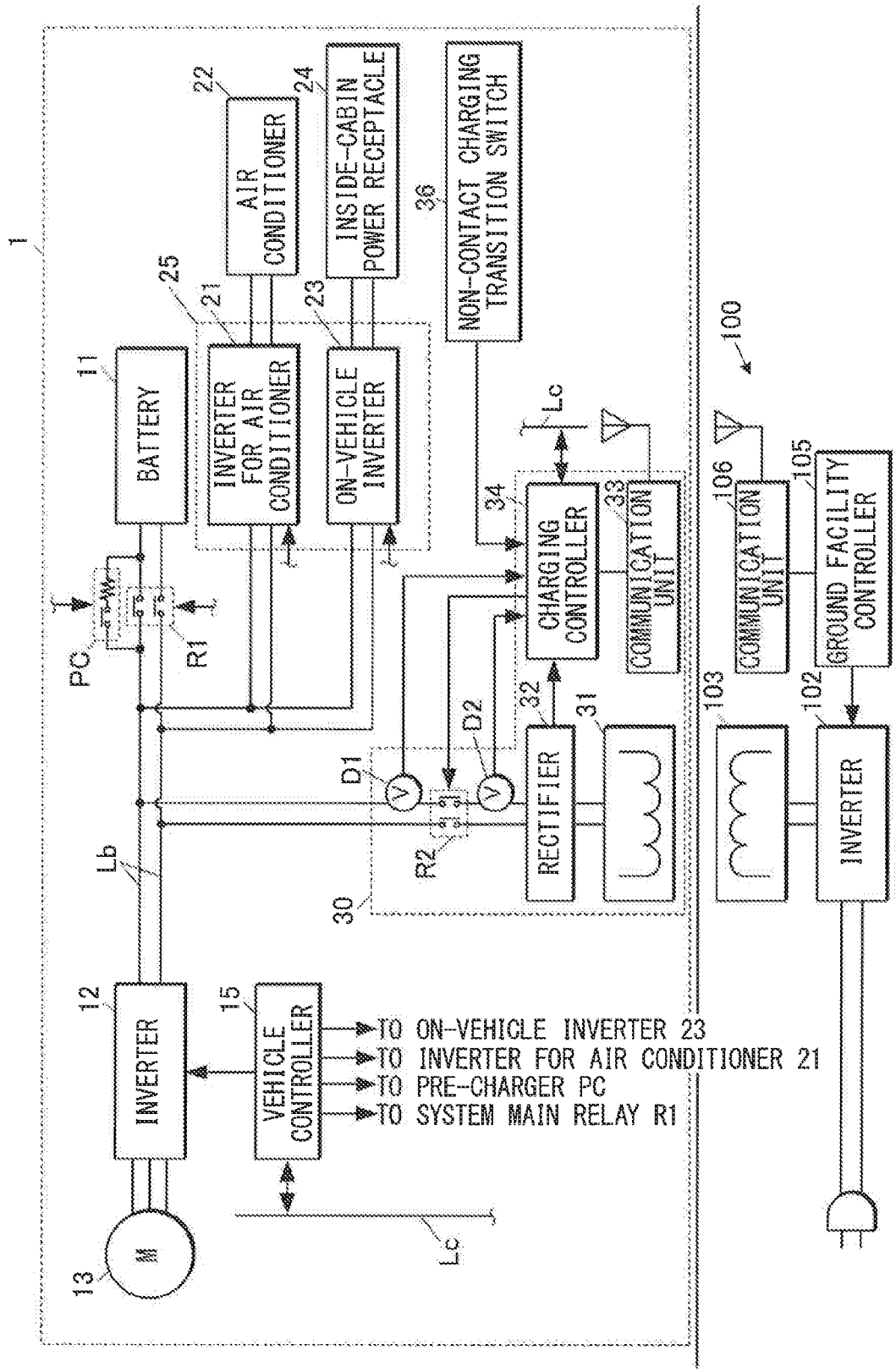
FIG. 1 is a block diagram illustrating a vehicle according to an embodiment of the technology.

In a vehicle including a high-voltage battery, a relay switching control is carried out in order to hinder an excessive current such as a rush current from flowing through a relay. For example, at a start of charging with a charging relay switched to a connected state, a system main relay is once brought to a disconnected state, causing separation of the high-voltage battery from a power supply line. Thereafter, the charging relay is switched to the connected state. Then, the system main relay is switched again to a connected state. To the system main relay, attached is a protection mechanism. The protection mechanism allows a voltage between both ends of the system main relay to change mildly. Accordingly, the procedure described above makes it possible to couple the high-voltage battery and an electric power acquirer through the power supply line, without letting an excessive current flow through both the charging relay and the system main relay.

In a case where the high-voltage battery is charged while an on-vehicle device or an electric device coupled to a power receptacle of utilities is in operation, however, the relay switching control as described above may cause possibility of temporary interruption of power supply of the on-vehicle device or the electric device.

It is desirable to provide a vehicle that allows for continuous use of a device using electric power of a battery, as well as protection of a relay, at a start of charging of the battery with the device driven with electric power of the battery.

In the following, some preferred but non-limiting embodiments of the technology are described in detail with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a dimension of each of the elements, a material of each of the elements, a ratio between the elements, relative positional relationship between the elements, and any other specific numerical value are illustrative only and not to be construed as limiting to the technology. Further, elements in the following example embodiments which are not recited in a most-generic independent claim of the disclosure are optional and may be provided on an as-needed basis. Throughout the specification and the drawings, elements having substantially the same function and configuration are denoted with the same reference characters to avoid redundant description, and elements not in direct relation to the technology may not be illustrated.

FIG. 1 is a block diagram illustrating a vehicle according to an embodiment of the technology.

A vehicle 1 according to an embodiment of the technology may be, for example, an electric vehicle (EV) and a hybrid electric vehicle (HEV). The vehicle 1 may include a battery 11, a traveling motor 13, and an inverter 12. The battery 11 may accumulate electric power for travel of the vehicle 1. The traveling motor 13 may drive a driving wheel. The inverter 12 may convert electric power between the battery 11 and the traveling motor 13. The battery 11 may output a high voltage that drives the traveling motor 13 and may be referred to as a high-voltage battery. The battery 11 may include, for example, a secondary battery such as a lithium-ion storage battery or a nickel hydrogen storage battery.

The vehicle 1 may further include a system main relay R1, a pre-charger PC, and a power supply line Lb. The battery 11 may be coupled to the power supply line Lb through the system main relay R1 and the pre-charger PC. The pre-charger PC may bring voltages at both ends of the system main relay R1 slowly closer to each other, with the system main relay R1 in a disconnected state. To connect the battery 11 to the power supply line Lb, first, the pre-charger PC may be switched to a connected state, thereby reducing a potential difference between both ends of the system main relay R1. Thereafter, the system main relay R1 may be switched to a connected state and the pre-charger PC may be switched to a disconnected state. This makes it possible to switch the system main relay R1 from the disconnected state to the connected state, without an excessive current flowing through the system main relay R1. Hereinafter, description that the system main relay R1 is switched to the connected state is assumed to include the forgoing switching operation of the pre-charger PC.

In one embodiment of the technology, the system main relay R1 may serve as a "first relay".

The vehicle 1 may further include a vehicle controller 15. The vehicle controller 15 may perform a travel control of the vehicle 1 and a control of each part of the vehicle 1. The vehicle controller 15 may include a single electronic control unit (ECU), or alternatively, the vehicle controller 15 may include a plurality of ECUs that operate in cooperation with one another. For example, the vehicle controller 15 may drive the inverter 12 to cause powering operation or regenerative operation of the traveling motor 13, in accordance with an operation of a driving operation unit, e.g., an undepicted pedal and an undepicted shift lever. This leads to the travel of the vehicle 1 in accordance with a driving operation. In addition, the vehicle controller 15 may perform a start-up control of a power supply unit 25 and a switching control of the system main relay R1 and the pre-charger PC.

The vehicle 1 may further include the power supply unit 25. The power supply unit 25 is able to supply a power supply voltage to an electric device other than the traveling motor 13, using electric power of the battery 11. The power supply unit 25 may include an inverter for air conditioner 21 and an on-vehicle inverter 23. The inverter for air conditioner 21 may convert electric power of the battery 11 and send a driving current to the air conditioner 22, that is, for example, to a compressor. The on-vehicle inverter 23 may convert electric power of the battery 11 into an AC power supply voltage, and output the AC power supply voltage to an inside-cabin power receptacle 24. An occupant of the vehicle 1 may drive the on-vehicle inverter 23, and thereby be able to couple, for example, a home electric appliance to the inside-cabin power receptacle 24 and use the home electric appliance. Although not illustrated, the vehicle 1 may include a positive temperature coefficient (PTC) heater as a load to be coupled to the power supply line Lb. The PTC heater may include a heater that heats air conditioning coolant or the battery 11. The PTC heater may be coupled to the power supply line Lb through a heater switch.

Instead of the inside-cabin power receptacle 24, or in addition to the inside-cabin power receptacle 24, a vehicle exterior power receptacle or an indoor power receptacle may be coupled to the on-vehicle inverter 23. The vehicle exterior power receptacle or the indoor power receptacle makes it possible to use an electric appliance near the vehicle 1, or outside a cabin of the vehicle 1. In another alternative, instead of the on-vehicle inverter 23, the power supply unit 25 may include a connector and a relay to which an external inverter may be coupled. Coupling the external inverter to the connector and turning the relay on causes electric power supply from the power supply line Lb to the inverter in accordance with a control by the vehicle controller 15, causing an AC power supply voltage to be outputted from the external inverter to the vehicle exterior power receptacle. Alternatively, the AC power supply voltage may be outputted from the external inverter to a household power receptacle. A configuration of supplying the AC power supply voltage from the vehicle 1 to vehicle exterior may be V2L (Vehicle to Load), and a configuration of supplying the AC power supply voltage from the vehicle 1 to indoor may be V2H (Vehicle to Home). With such a configuration, it is possible for a user of the vehicle 1 to use an electric appliance near the vehicle 1 or at home, using electric power supplied from the vehicle 1.

The vehicle 1 may further include a non-contact charging mechanism 30. The non-contact charging mechanism 30 may acquirer electric power non-contact from ground facilities 100. The non-contact charging mechanism 30 may include a power receiving coil 31, a rectifier 32, voltage sensors D1 and D2, a communication unit 33, a charging controller 34, and a charging relay R2. The communication unit 33 may perform wireless communication. The power receiving coil 31 may receive electric power from a power transmitting coil 103 of the ground facilities 100 by electromagnetic coupling or electromagnetic resonance in an opposed state to the power transmitting coil 103. The rectifier 32 may rectify an AC current outputted from the power receiving coil 31 and send the rectified AC current toward the power supply line Lb. The charging relay R2 may switch the rectifier 32 and the power supply line Lb between a connected state and a disconnected state. The voltage sensors D1 and D2 may detect a voltage of the charging relay R2 on the side on which the power supply line Lb is disposed and a voltage of the charging relay R2 on the side on which the rectifier 32 is disposed. The voltage sensors D1 and D2 may transmit detected values to the charging controller 34.

The charging controller 34 may include an ECU including a central processing unit (CPU), a storage, and a random access memory (RAM). The storage may hold control programs to be executed by the CPU and control data. The RAM is provided for expansion of data by the CPU. The charging controller 34 may communicate with the ground facilities 100 through the communication unit 33, and receive voltage data from the rectifier 32, to perform a control of non-contact charging. The control of the non-contact charging may include a switching control of the charging relay R2. The charging controller 34 may perform communication through a communication line Lc and cooperate with the vehicle controller 15. That is, the charging controller 34 is able to perform the switching control of the system main relay R1 through the vehicle controller 15.

The vehicle 1 may further include a non-contact charging transition switch 36. The non-contact charging transition switch 36 may be provided on, for example, a dashboard. The occupant of the vehicle 1 may operate the non-contact charging transition switch 36, to give the charging controller 34 a command to make a transition to the non-contact charging.

It is to be noted that because the vehicle controller 15 and the charging controller 34 cooperate by the communication through the communication line Lc, part of processing of the vehicle controller 15 illustrated in the example of FIG. 1, e.g., the switching control of the system main relay R1, may be performed by the charging controller 34. Conversely, part of processing of the charging controller 34 illustrated in the example of FIG. 1, e.g., signal input from the non-contact charging transition switch 36 and the switching control of the charging relay R2, may be performed by the vehicle controller 15. Moreover, the vehicle controller 15 and the charging controller 34 do not have to be separate from each other, but may be unified as a unitary controller.

The ground facilities 100 may include the power transmitting coil 103, an inverter 102, a communication unit 106, and a ground facility controller 105. The power transmitting coil 103 may transmit electric power in a non-contact manner. The inverter 102 may convert electric power from an external power supply and output converted electric power to the power transmitting coil 103. The communication unit 106 is able to communicate with the charging controller 34 of the vehicle 1. The ground facility controller 105 may perform a drive control of the inverter 102. The charging controller 34 of the vehicle 1 is able to send a request for excitation of the power transmitting coil 103 to the ground facility controller 105 by wireless communication of the communication units 33 and 106.

<Transition Processing to Non-Contact Charging>

Described next is non-contact charging processing of charging the battery 11 using the non-contact charging mechanism 30. The non-contact charging processing may include transition processing to non-contact charging and electric power transmission processing. The transition processing to the non-contact charging may include causing the vehicle 1 to make a transition to a state in which the vehicle 1 is available for electric power transmission. The electric power transmission processing may include transmitting electric power in the non-contact manner to actually charge the battery 11. In the non-contact charging processing, there may be cases where the occupant of the vehicle 1 uses the air conditioner 22 or some electric device, with the utilization of the power supply unit 25, and cases where the power supply unit 25 is out of use. While the occupant uses the electric device, a shutdown of the power supply unit 25 causes a shutdown of the electric device in use, which may give the occupant a sense of discomfort.

Figure 2:
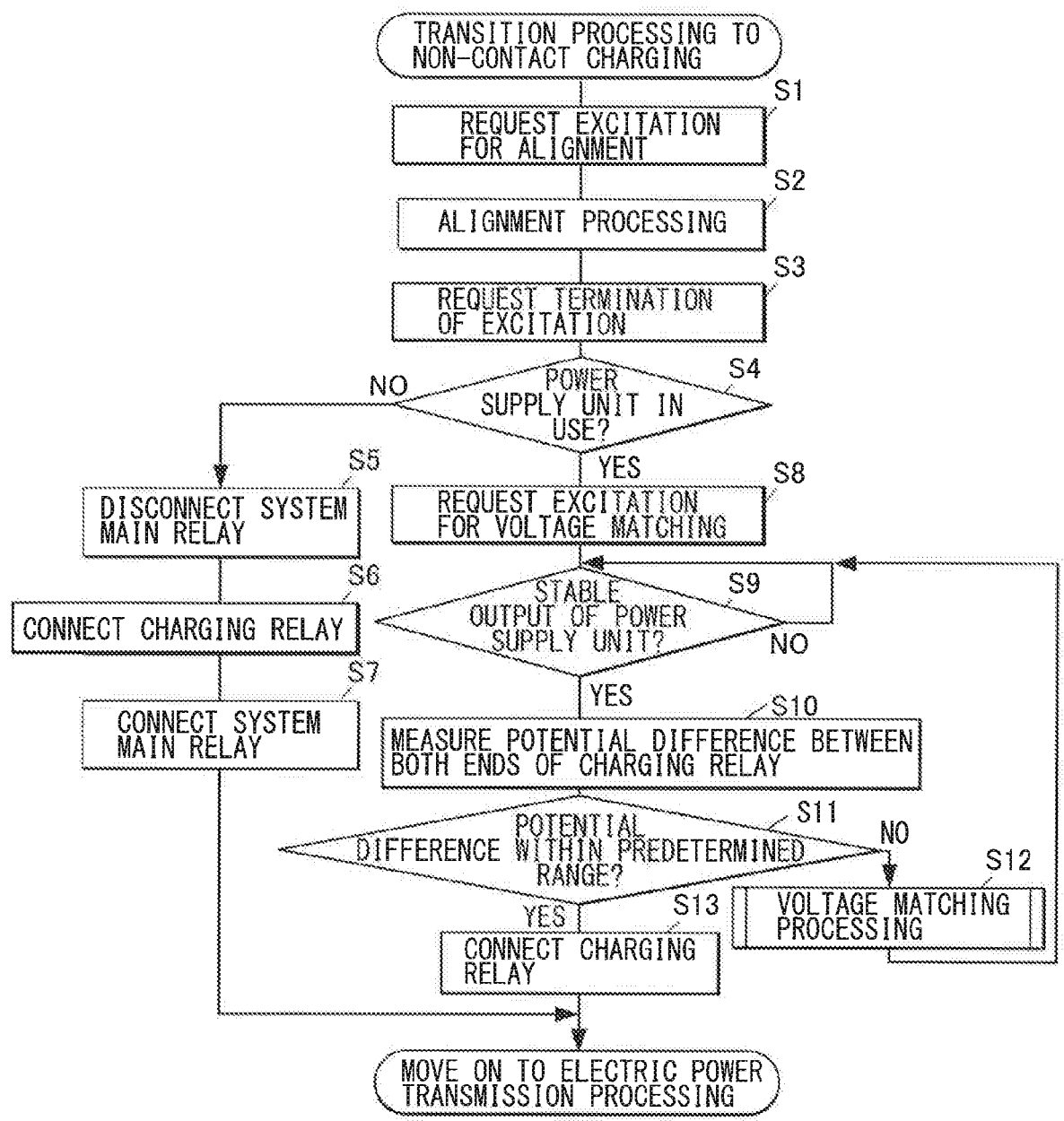
FIG. 2 is a flowchart illustrating a procedure of transition processing to non-contact charging to be executed by a charging controller.
Figure 3:
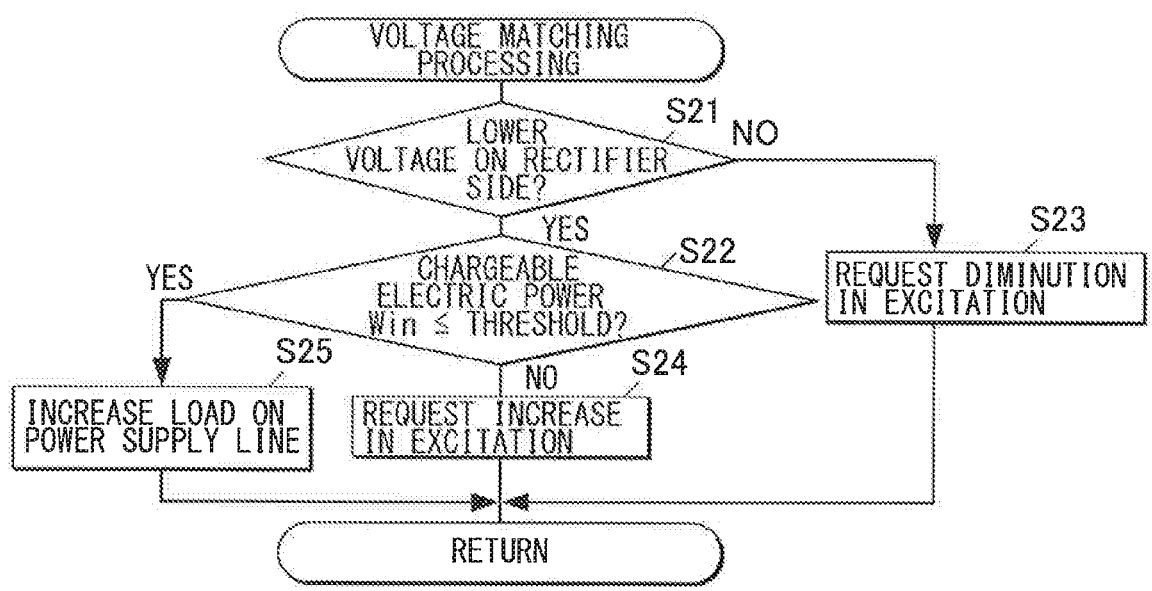
FIG. 3 is a flowchart illustrating details of voltage matching processing of step S12 in FIG. 2.

FIG. 2 is a flowchart illustrating a procedure of the transition processing to the non-contact charging to be executed by the charging controller 34. FIG. 3 is a flowchart illustrating details of voltage matching processing of step S12 in FIG. 2.

The transition processing to the non-contact charging may be started by the driver's operation of the non-contact charging transition switch 36 when the vehicle 1 is in the vicinity of the ground facilities 100. At the start of this processing, first, the charging controller 34 may communicate with the ground facility controller 105 through the communication unit 33 and request excitation for alignment of the ground facility controller 105 (step S1). The excitation for alignment is excitation that causes alignment of the power receiving coil 31 with the power transmitting coil 103, and has much smaller intensity than excitation during the charging.

In one embodiment of the technology, the request for the excitation in step S1 may serve as a "first excitation request".

The excitation for alignment is performed on the basis of the request in step S1, and thereupon, the charging controller 34 may execute alignment processing (step S2). In the alignment processing, while monitoring induced electromotive force generated in the rectifier 32, the charging controller 34 may induce the driver to move the vehicle 1 or send a command to an automated operation function, causing the alignment of the power receiving coil 31 at an opposed position to the power transmitting coil 103. When the vehicle 1 stops with the induced electromotive force of predetermined magnitude generated in the power receiving coil 31 because of the induction of the charging controller 34, the charging controller 34 may communicate with the ground facility controller 105 through the communication unit 33, and request the ground facility controller 105 to terminate the excitation (step S3). Thus, the excitation of the power transmitting coil 103 is once ended.

Thereafter, the charging controller 34 may make an inquiry to the vehicle controller 15 to determine whether or not the power supply unit 25 is in use (step S4). As a result, in a case where the power supply unit 25 is out of use (step S4: NO), the charging controller 34 may couple the power receiving coil 31 and the rectifier 32 to the power supply line Lb by relay switching processing of a normal method (steps S5 to S7). That is, first, the charging controller 34 may switch the system main relay R1 to the disconnected state through the vehicle controller 15 (step S5), and couple the charging relay R2 when a voltage of the power supply line Lb drops (step S6). In addition, the charging controller 34 may switch the system main relay R1 to the connected state through the vehicle controller 15 (step S7). In the switching of step S7, the forgoing switching operation of the pre-charger PC leads to suppression of an excessive current such as a rush current flowing through the system main relay R1 and/or the charging relay R2. Upon completion of the relay switching processing of the normal method in steps S5 to S7, the charging controller 34 may terminate the transition processing to the non-contact charging and move on to the electric power transmission processing.

Meanwhile, as a result of the determination in step S4, in a case where the power supply unit 25 is in use (step S4: YES), the charging controller 34 may couple the power receiving coil 31 and the rectifier 32 to the power supply line Lb by relay switching processing of another method (steps S8 to S13). The relay switching processing in steps S8 to S13 is hereinafter referred to as "relay switching processing of a first method".

In one embodiment of the technology, the relay switching processing of the first method may serve as a "first switching control".

In the relay switching processing of the first method, first, the charging controller 34 may request excitation for voltage matching of the ground facility controller 105 by communication through the communication unit 33 (step S8). This excitation may be higher than the excitation for alignment and lower than excitation during the electric power transmission. This excitation may be set in advance at magnitude enough to raise the voltage of the charging relay R2 on the side on which the rectifier 32 is disposed to a voltage level with a voltage of the power supply line Lb. Because the charging relay R2 is disconnected, even the excitation lower than the excitation during the electric power transmission causes a relatively great rise in the voltage of the charging relay R2 on the side on which the rectifier 32 is disposed.

Thereafter, in cooperation with the vehicle controller 15, the charging controller 34 may determine whether or not it is a period when an output of the power supply unit 25 is stable (step S9). In a case where the output of the power supply unit 25 is stable (step S9: YES), the charging controller 34 may measure a potential difference between both ends of the charging relay R2 from outputs of the voltage sensors D1 and D2 (step S10). Thereafter, the charging controller 34 may determine whether or not the measured potential difference is within a predetermined range (step S11). As the predetermined range, a voltage range may be set in which switching the charging relay R2 to the connected state does not cause an excessive current flowing through the charging relay R2. In the determination of step S11, in a case with a determination that the potential difference is within the predetermined range (step S11: YES), the charging controller 34 may switch, at the timing of the determination, the charging relay R2 to the connected state (step S13).

Meanwhile, in the determination processing of step S11, in a case with a determination that the potential difference falls out of the predetermined range (step S11: NO), the charging controller 34 may execute the voltage matching processing of step S12 (step S12). As illustrated in FIG. 3, in the voltage matching processing, first, the charging controller 34 may determine whether or not the voltage of the charging relay R2 on the side on which the rectifier 32 is disposed is lower than the voltage of the charging relay R2 on the side on which the power supply line Lb is disposed (step S21). In a case where the voltage of the charging relay R2 on the side on which the rectifier 32 is higher (step S21: NO), the charging controller 34 may request the ground facility controller 105 to diminish the excitation of the power transmitting coil 103, by the communication through the communication unit 33 (step S23). The charging controller 34 may request diminution by predetermined magnitude of one step, or alternatively, the charging controller 34 may request, in accordance with the potential difference compared in step S21, diminution by magnitude enough to eliminate the potential difference. After making the request for the diminution in the excitation in step S23, the charging controller 34 may terminate the voltage matching processing and return to step S9 in the transition processing to the non-contact charging (FIG. 2).

Meanwhile, in the determination of step S21, in a case with a determination that the voltage of the charging relay R2 on the side on which the rectifier 32 is disposed is lower (step S21: YES), the charging controller 34 may determine whether or not chargeable electric power Win of the battery 11 is equal to or lower than a preset threshold (step S22). Data regarding the chargeable electric power Win may be calculated and held by an undepicted manager of the battery 11, e.g., a battery control unit, from various status data such as a temperature and a voltage of the battery 11. The charging controller 34 is able to acquire the chargeable electric power Win from the manager of the battery 11 through the communication line Lc. The chargeable electric power Win means a limit on charging electric power that is able to be flown through the battery 11. For example, in a case where the battery 11 is cold or has a high state of charge, the chargeable electric power Win is small. In a case where the chargeable electric power Win is small, bringing the charging relay R2 to the connected state, with the voltage of the charging relay R2 on the side on which the rectifier 32 is disposed being high, may cause possibility that electric power to be transmitted from the non-contact charging mechanism 30 to the battery 11 becomes greater than the chargeable electric power Win. It is therefore preferable that the voltage of the charging relay R2 on the side on which the rectifier 32 is disposed be not high.

As a result of the determination of step S22, in a case where the chargeable electric power Win is greater than the threshold (step S22: NO), the charging controller 34 may request the ground facility controller 105 to increase the excitation of the power transmitting coil 103 by the communication through the communication unit 33 (step S24). The charging controller 34 may request an increase by predetermined magnitude of one step, or alternatively, the charging controller 34 may request, in accordance with the potential difference compared in step S21, an increase by magnitude enough to eliminate the potential difference. After making the request for the increase in the excitation in step S24, the charging controller 34 may terminate the voltage matching processing and return to step S9 in the transition processing to the non-contact charging (FIG. 2).

As a result of the determination in step S22, in a case where the chargeable electric power Win is equal to or smaller than the threshold (step S22: YES), the charging controller 34 may increase the load coupled to the power supply line Lb (step S25). The load coupled to the power supply line Lb may be increased by making a request of the vehicle controller 15, for example, to drive the PTC heater, to drive solely the traveling motor 13 with the driving wheel disconnected, or to increase an amount of driving of the air conditioner 22. In this way, the voltage of the charging relay R2 on the side on which the power supply line Lb is disposed lowers, making it possible to reduce the potential difference between both ends of the charging relay R2. After increasing the load in step S25, the charging controller 34 may terminate the voltage matching processing and return to step S9 in the transition processing to the non-contact charging (FIG. 2).

With the voltage matching processing as described above, even in the case where the potential difference between both ends of the charge relay R2 is equal to or greater than the predetermined range, it is possible to reduce the potential difference. In the transition processing to the non-contact charging (FIG. 2), repeating the loop processing of steps S9 to S12 allows the potential difference between both ends of the charging relay R2 to be reduced to within the predetermined range. In this state, it is possible to switch the charging relay R2 to the connected state, in order to prevent an excessive current from flowing through the charging relay R2.

After completion of the transition processing to the non-contact charging, the charging controller 34 may move on to the electric power transmission processing, and the power transmitting coil 103 may be excited for the electric power transmission. This excitation causes a charging current to be sent to the battery 11 through the power receiving coil 31, the rectifier 32, the charging relay R2, and the system main relay R1. Moreover, it is possible to continue the use of the electric device without interruption of electric power supply even in the case where the electric device is used by receiving electric power from the power supply unit 25 before the charging.

As described above, according to the vehicle 1 of this embodiment, the charging controller 34 executes the relay switching processing of the first method (steps S8 to S13 in FIG. 2). Hence, it is possible to switch the charging relay R2 to the connected state, with the system main relay R1 kept in the connected state. Moreover, in the relay switching processing of the first method (steps S8 to S13), the charging controller 34 reduces the potential difference of the charging relay R2 between the side on which the power supply line Lb is disposed and the side on which the rectifier 32 is disposed, using electric power acquired from the ground facilities 100. This allows the charging relay R2 to be switched to the connected state, with the potential difference reduced. Hence, it is possible to start the charging of the battery 11 without the interruption of the electric power supply from the power supply unit 25, even at the start of the charging while the power supply unit 25 is in use. Furthermore, it is possible to protect the charging relay R2, to prevent a large current from flowing through the charging relay R2 at the time of the switching of the state of the charging relay R2.

In a case where a charging mode of the battery 11 is the non-contact charging, the driver or the occupant often stays inside the vehicle cabin at the start of the charging, in which cases the driver or the occupant often uses the electric device with electric power from the power supply unit 25 at the start of the charging of the battery 11. This makes it even more effective that the forgoing relay switching processing of the first method allows for the start of the non-contact charging without a temporary shutdown of the power supply unit 25.

Moreover, the relay switching processing of the first method (steps S8 to S13) makes unnecessary the disconnection of the system main relay R1 and the pre-charging operation by the pre-charger PC. Hence, it is possible to connect the charging relay R2 in short time and to make the system available for the charging, as compared with the existing relay switching method. Furthermore, because the operation of the system main relay R1 and the pre-charger PC becomes unnecessary, it is possible to alleviate aging deterioration of the system main relay R1 and the pre-charger PC.

Further, according to the vehicle 1 of this embodiment, in the voltage matching processing (FIG. 3), the charging controller 34 may increase the load coupled to the power supply line Lb, and thereby reduce the potential difference between both ends of the charging relay R2 (step S25). Merging such processing makes it possible to lower the potential on the side on which the power supply line Lb is disposed, and to reduce the potential difference between both ends of the charging relay R2, even in a case where it is not desired to excessively increase the voltage on the side on which the rectifier 32 is disposed.

Moreover, according to the vehicle 1 of this embodiment, the charging controller 34 may switch between execution and non-execution of the control of increasing or decreasing the load coupled to the power supply line Lb on the basis of the chargeable electric power Win of the battery 11 (step S22 in FIG. 3). Accordingly, in the case where the chargeable electric power Win of the battery 11 is small, it is possible to lower the voltage on the side on which the power supply line Lb is disposed, and to reduce the potential difference between both ends of the charging relay R2, while suppressing a large charging current from flowing into the battery 11.

Furthermore, according to the vehicle 1 of this embodiment, before switching the charging relay R2 to the connected state, the charging controller 34 may determine whether or not the power supply unit 25 is in use (step S4 in FIG. 2). In the case where the power supply unit 25 is in use, the charging controller 34 may switch the charging relay R2 to the connected state with the system main relay R1 connected, in accordance with the relay switching processing of the first method (steps S8 to S13). Meanwhile, in the case where the power supply unit 25 is out of use, the charging controller 34 may execute the relay switching processing of the normal method (steps S5 to S7). Hence, it is possible to omit the voltage matching processing in the situation where the disconnection of the system main relay R1 is permissible.

In addition, according to the vehicle 1 of this embodiment, in the relay switching processing of the first method (steps S8 to S13), the charging controller 34 may make the request of the ground facilities 100 for the excitation that is lower than is performed during the electric power transmission and higher than is performed during the alignment (step S8). This makes it possible to raise, during the non-contact charging, the potential of the charging relay R2 on the side on which the rectifier 32 is disposed. Hence, it is possible to reduce the potential difference between both ends of the charging relay R2.

In one embodiment of the technology, the request for the excitation in step S8 may serve as a "second excitation request".

Although some preferred but non-limiting embodiments of the technology are described above by way of example with reference to the accompanying drawings, the technology is by no means limited to the embodiments described above. It should be appreciated that modifications and alterations may be made by persons skilled in the art without departing from the scope as defined by the appended claims.

For example, some vehicles may include two kinds of power supply units: a power supply unit interruption of electric power supply to which is permissible, e.g., an inverter for air conditioner and a heater switch; and a power supply unit to which an electric device interruption of electric power supply to which is impermissible, e.g., an on-vehicle inverter, may be possibly coupled. In the forgoing embodiment, described is a configuration in which the inverter for air conditioner, the on-vehicle inverter, and the heater switch may all serve as a "power supply unit" of the technology, and if any one of them is in use, the relay switching processing of the first method (steps S8 to S13) is selected. In an alternative example, out of such power supply units, solely some specific power supply unit interruption of electric power supply to which is sometimes impermissible may serve as a "power supply unit" of the technology. In a case where the specific power supply unit is in use, the relay switching processing of the first method (steps S8 to S13) may be selected, while in a case where the specific power supply unit is out of use, the relay switching processing of the normal method (steps S5 to S7) may be selected.

Moreover, in the forgoing embodiment, described is a configuration in which the dedicated voltage sensors D1 and D2 are provided for the measurement of the potential difference between both ends of the charge relay R2. However, instead of the voltage sensor D1, for example, a voltage sensor inside the inverter 12 or a voltage sensor of the battery 11 may be used. Further, the voltage sensor D2 may be provided inside the rectifier 32 or inside the power receiving coil 31. Alternatively, instead of the voltage sensor D2, a configuration may be adopted in which the voltage on the side on which the rectifier 32 is disposed is estimated from, for example, excitation intensity data of the power transmitting coil.

In the control processing described in the forgoing embodiment, for example, steps S4 to S7 in FIG. 2 may be omitted, and the relay switching processing of the first method may be performed regardless of whether or not the power supply unit is in use. Moreover, in the relay switching processing of the first method, the process of checking and adjusting the potential difference in steps S9 to S12 may be omitted, and the control of reducing the potential difference between both ends of the charging relay may be completed solely by the excitation for voltage matching. Furthermore, in the voltage matching processing, steps S22 and S25 may be omitted, and the voltage matching may be carried out solely by increasing or decreasing the excitation.

Moreover, the forgoing embodiment exemplifies a configuration with an "electric power acquirer" of the technology configured to perform non-contact electric power transmission. However, the "electric power acquirer" of the technology may be configured to transmit electric power from an external power supply by wired connection. For example, in a vehicle that charges a battery by acquiring a DC power supply voltage from outside, the "electric power acquirer" to which the DC power supply voltage is inputted may have a configuration in which the power receiving coil and the rectifier in the non-contact charging mechanism are replaced with a wired power line and the communication unit is replaced with a communication unit of a wired method. Otherwise, the "electric power acquirer" may include substantially similar constituent elements to those of the non-contact charging mechanism. Accordingly, the technology is applicable to vehicles that charge a battery from a DC power supply through wired connection, with the similar configurations and control methods as those of the forgoing embodiment. In addition, the details described in the forgoing embodiment may be appropriately changed insofar as the changes fall within a range not departing from the scope of the technology.

According to the aspect of the technology, a first switching control allows a second relay to be switched from a disconnected state to a connected state, with a first relay kept in a connected state. This allows for continuous use of a power supply unit, without interruption of power supply to a device at a start of charging of a battery during use of the power supply unit. On the other hand, simply switching the second relay from the disconnected state to the connected state with the first relay kept in the connected state as described above without any devisement may cause possibility of a large current flow through the second relay. Thus, in the first switching control, the switching of the second relay is accompanied by reducing a potential difference between both ends of the second relay, using electric power inputted from an electric power acquirer. This makes it possible to suppress the large current flow through the second relay, in the case where the second relay is connected, with the battery coupled to a power supply line. Hence, it is possible to allow for the continuous use of a device with the power supply unit, as well as protection of the second relay, in the case with the battery charged during the use of the power supply unit.

The charging controller 34 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the charging controller 34. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the charging controller 34 illustrated in FIG. 1.

It should be appreciated that modifications and alterations may be made by persons skilled in the art without departing from the scope as defined by the appended claims. The use of the terms first, second, etc. does not denote any order or importance, but rather the terms first, second, etc. are used to distinguish one element from another. The technology is intended to include such modifications and alterations in so far as they fall within the scope of the appended claims or the equivalents thereof.

The invention claimed is:
1. A vehicle, comprising:
a battery configured to accumulate electric power for travel of a vehicle;
an electric power acquirer configured to acquire charging electric power from outside;
a power supply unit able to provide a power supply from the battery to a device other than a traveling motor;
a first relay configured to connect the battery to a power supply line or to disconnect the battery from the power supply line;
a second relay configured to connect the electric power acquirer to the power supply line or to disconnect the electric power acquirer from the power supply line; and
a controller able to execute a first switching control, the first switching control including switching the second relay to a connected state with the first relay kept in a connected state,
wherein, in the switching of the second relay to the connected state in the first switching control, the controller is configured to reduce a difference between a potential of the second relay on a side on which the electric power acquirer is disposed and a potential of the second relay on a side on which the battery is disposed, using electric power inputted from the electric power acquirer,
wherein the power supply unit is coupled to the first relay at a location of the power supply line located between the first relay and the second relay, wherein in the first switching control, the controller further performs processing of increasing a load coupled to the power supply line to reduce the potential of the second relay on the side on which the battery is disposed, and wherein the controller switches between execution and non-execution of the processing of increasing the load to reduce the potential of the second relay on the side on which the battery is disposed on a basis of chargeable electric power of the battery.

2. The vehicle according to claim 1, wherein, in the first switching control, the controller measures the difference between the potential of the second relay on the side on which the battery is disposed and the potential of the second relay on the side on which the electric power acquirer is disposed, and wherein, on a condition that the difference measured falls within a predetermined range, the controller switches the second relay to the connected state.

3. The vehicle according to claim 2, wherein, before switching the second relay to the connected state, the controller determines whether or not the power supply unit is in use, and wherein, on a condition that the power supply unit is in use, the controller switches the second relay in accordance with the first switching control, while on a condition that the power supply unit is out of use, the controller switches the second relay in accordance with a second switching control.

4. The vehicle according to claim 2, wherein the electric power acquirer includes a power receiving coil configured to acquire electric power non-contact from a power transmitting coil of ground facilities, wherein the vehicle further includes a charging controller configured to make a first excitation request of the ground facilities to perform lower excitation of the power transmitting coil than is performed during transmission of charging electric power, to make a determination as to alignment of the power transmitting coil and the power receiving coil, and wherein the controller makes, in the first switching control, a second excitation request of the ground facilities to perform excitation that is higher than is performed on the first excitation request and lower than is performed during the transmission of charging electric power.

5. The vehicle according to claim 1, wherein, before switching the second relay to the connected state, the controller determines whether or not the power supply unit is in use, and wherein, on a condition that the power supply unit is in use, the controller switches the second relay in accordance with the first switching control, while on a condition that the power supply unit is out of use, the controller switches the second relay in accordance with a second switching control.

6. The vehicle according to claim 1, wherein the electric power acquirer includes a power receiving coil configured to acquire electric power non-contact from a power transmitting coil of ground facilities, wherein the vehicle further includes a charging controller configured to make a first excitation request of the ground facilities to perform lower excitation of the power transmitting coil than is performed during transmission of charging electric power, to make a determination as to alignment of the power transmitting coil and the power receiving coil, and wherein the controller makes, in the first switching control, a second excitation request of the ground facilities to perform excitation that is higher than is performed on the first excitation request and lower than is performed during the transmission of charging electric power.

7. A vehicle, comprising:

a battery configured to accumulate electric power for travel of a vehicle;

an electric power acquirer configured to acquire charging electric power from outside;

a power supply unit able to provide a power supply from the battery to a device other than a traveling motor;

a first relay configured to connect the battery to a power supply line or to disconnect the battery from the power supply line;

a second relay configured to connect the electric power acquirer to the power supply line or to disconnect the electric power acquirer from the power supply line; and a controller able to execute a switching control, the switching control including switching the second relay to a connected state with the first relay kept in a connected state, wherein, in the switching of the second relay to the connected state in the switching control, the controller is configured to reduce a difference between a potential of the second relay on a side on which the electric power acquirer is disposed and a potential of the second relay on a side on which the battery is disposed, using electric power inputted from the electric power acquirer, wherein, in the switching control, the controller measures the difference between the potential of the second relay on the side on which the battery is disposed and the potential of the second relay on the side on which the electric power acquirer is disposed, and wherein, on a condition that the difference measured falls within a predetermined range, the controller switches the second relay to the connected state.

8. A vehicle, comprising:

a battery configured to accumulate electric power for travel of a vehicle;

an electric power acquirer configured to acquire charging electric power from outside;

a power supply unit able to provide a power supply from the battery to a device other than a traveling motor;

a first relay configured to connect the battery to a power supply line or to disconnect the battery from the power supply line;

a second relay configured to connect the electric power acquirer to the power supply line or to disconnect the electric power acquirer from the power supply line; and a controller able to execute a switching control, the switching control including switching the second relay to a connected state with the first relay kept in a connected state, wherein, in the switching of the second relay to the connected state in the switching control, the controller is configured to reduce a difference between a potential of the second relay on a side on which the electric power acquirer is disposed and a potential of the second relay on a side on which the battery is disposed, using electric power inputted from the electric power acquirer, wherein, before switching the second relay to the connected state, the controller determines whether or not the power supply unit is in use, and wherein, on a condition that the power supply unit is in use, the controller switches the second relay in accordance with the switching control, while on a condition that the power supply unit is out of use, the controller switches the second relay in accordance with another switching control.

* * * * *